US012649324B2

(12) United States Patent
Yoda et al.

(10) Patent No.: US 12,649,324 B2
(45) Date of Patent: Jun. 9, 2026

(54) PRINTING DEVICE INCLUDING A BLOWER MACHINE AND SOUND ABSORBING MATERIAL

(71) Applicant: SEIKO EPSON CORPORATION, Tokyo (JP)

(72) Inventors: Tomohiro Yoda, Matsumoto (JP); Tatsushi Nakaho, Asahi-Mura (JP); Tomohito Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 18/630,094

(22) Filed: Apr. 9, 2024

(65) Prior Publication Data

US 2024/0336074 A1 Oct. 10, 2024

(30) Foreign Application Priority Data

Apr. 10, 2023 (JP) ................................ 2023-063290

(51) Int. Cl.
*B41J 29/10* (2006.01)
*B41J 2/01* (2006.01)
*B41J 11/00* (2006.01)

(52) U.S. Cl.
CPC ...... *B41J 11/0022* (2021.01); *B41J 11/00216* (2021.01); *B41J 29/10* (2013.01)

(58) Field of Classification Search
None
See application file for complete search history.

(56) References Cited

U.S. PATENT DOCUMENTS 6,463,674 B1 * 10/2002 Meyers ................. F26B 21/086 34/304
2004/0046850 A1 * 3/2004 Domoto ............... B41J 11/0022 347/102
2019/0001707 A1 1/2019 Yoda
2019/0275813 A1 9/2019 Yoda
2020/0207121 A1 * 7/2020 Washio ................ B41J 11/0022
2023/0315010 A1 * 10/2023 Nojima ................... F24F 13/24 399/92

FOREIGN PATENT DOCUMENTS

JP H08-261498 A 10/1996
JP 2018205426 A * 12/2018
JP 2019-007714 A 1/2019
JP 2019-155653 A 9/2019

OTHER PUBLICATIONS

English translation of JP 2018-205426 A, publication date Dec. 27, 2018. (Year: 2018).*

* cited by examiner

*Primary Examiner* — Leslie J Evanisko
(74) *Attorney, Agent, or Firm* — WORKMAN NYDEGGER

(57) ABSTRACT

A printing device 1 includes a printing section 14 configured to eject liquid to a medium 90; a heat source 45 configured to generate heat for heating the liquid deposited to the medium 90; a blower machine 43 configured to blow gas toward the medium 90; and an air flow path 44 in which the gas flows, wherein the air flow path 44 is provided so as to surround the heat source 45 and sound absorbing materials 101 and 103 is arranged on an inner surface of the air flow path 44.

8 Claims, 7 Drawing Sheets

PRINTING DEVICE INCLUDING A BLOWER MACHINE AND SOUND ABSORBING MATERIAL

The present application is based on, and claims priority from JP Application Serial Number 2023-063290, filed Apr. 10, 2023, the disclosure of which is hereby incorporated by reference herein in its entirety.

BACKGROUND

1. Technical Field

The present disclosure relates to a printing device.

2. Related Art

In the related art, a printing device that dries liquid such as printing ink deposited to a medium by blowing air while heating the liquid has been known. For example, JP-A-2019-155653 discloses a heating device that changes a driving amount of a blower machine in accordance with the type of medium. The heating device controls the temperature of a process surface of the medium to which liquid is deposited by changing a driving amount of the blower machine.

However, in the device described in JP-A-2019-155653, when the driving amount of the blower machine is increased, it is difficult to reduce noise generated by a drive of the blower machine. That is, there has been a demand for a printing device that reduces noise generated from a blower machine.

SUMMARY

A printing device includes a printing section configured to eject liquid to a medium; a heat source configured to generate heat for heating the liquid deposited to the medium; a blower machine configured to blow gas toward the medium; and an air flow path in which the blower machine is provided and in which the gas flows, wherein the air flow path is provided so as to surround the heat source and a sound absorbing material is arranged on an inner surface of the air flow path.

DESCRIPTION OF EMBODIMENTS

With reference to the drawings, a description will be given of a printing device 1 that winds a medium on which printing is performed in a roll shape according to an embodiment described below. A medium on which the printing is performed, that is, a printed material is used for, for example, signage.

In each of the following drawings, only an X-axis or XYZ axes as a coordinate axis orthogonal to each other is attached as necessary, and a direction indicated by each arrow is defined as a + direction and a direction opposite to the + direction is defined as a − direction. In the following drawings, the size of each member is different from the actual size for convenience of illustration.

A +Z direction in the printing device 1 is referred to as an upper direction, and a −Z direction is referred to as a lower direction. In this specification, a state in which the printing device 1 is installed on a surface along a horizontal plane will be described.

1. First Embodiment

Figure 1:
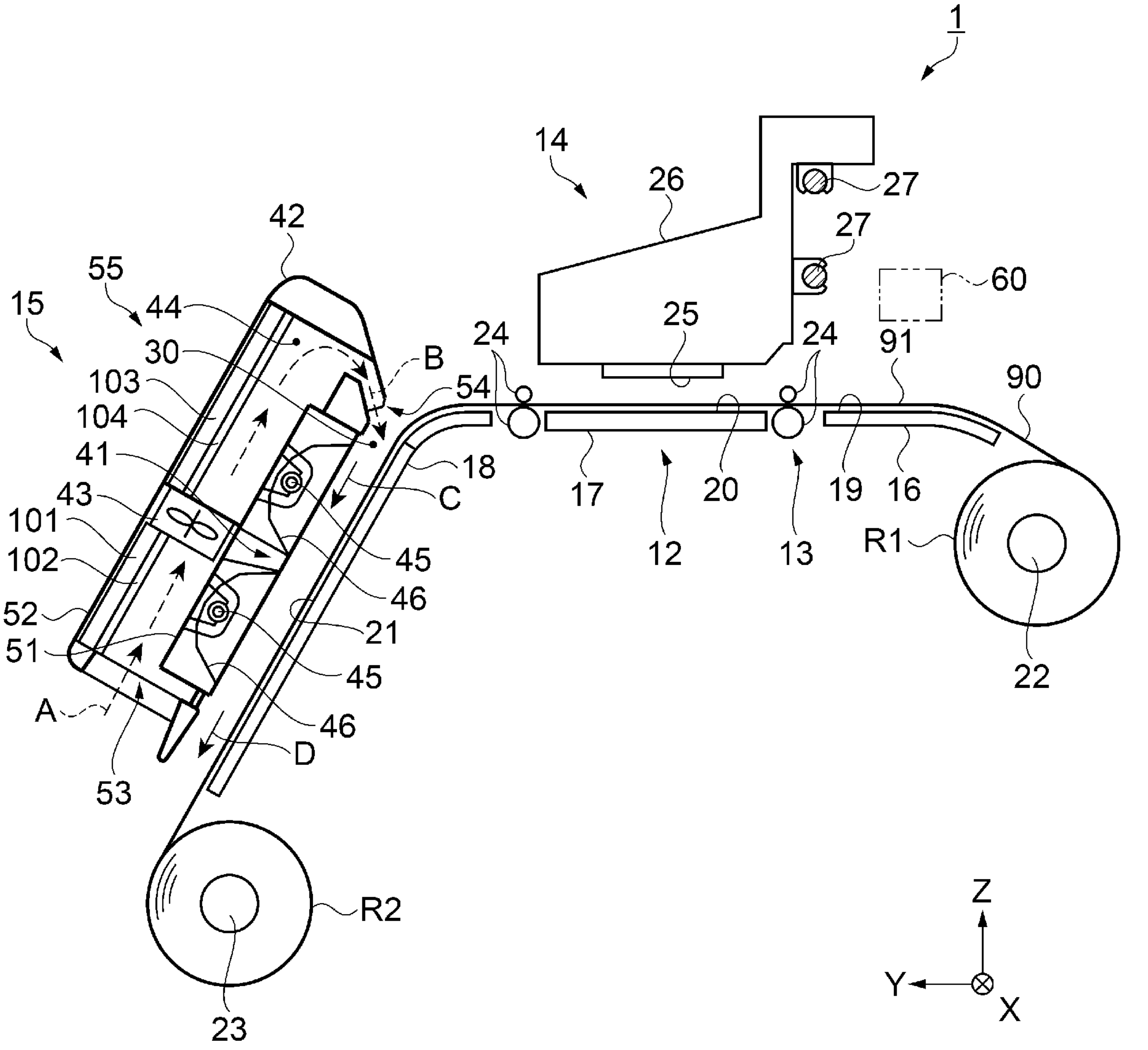
FIG. 1 is a schematic diagram showing a configuration of a printing device according to a first embodiment.

As shown in FIG. 1, the printing device 1 according to the present embodiment includes a support section 12, a transport section 13, a printing section 14, a heating device 15, and a control section 60. The support section 12 supports a medium 90. The transport section 13 transports the medium 90 along the support section 12. The printing section 14 ejects and deposits liquid such as ink to the medium 90. The heating device 15 heats the medium 90 to which the liquid is deposited by the printing section 14. The control section 60 integrally controls operation of various components of the printing device 1. In the description of FIG. 1, a state viewed from a side in a-X direction will be described unless otherwise specified.

The printing device 1 is an inkjet printer. In the printing device 1, ink as a liquid is made to deposit to the medium 90, and the ink is heated by the heating device 15. In the printing device 1, the medium 90 is sent out from a roll body R1 which is an original sheet, and printing is performed. Then, the printed material is wound on a roll body R2. In order to wind the printed material into a roll, ink is dried by heating prior to winding.

A path of the medium 90 from being unwound from the original sheet to being wound is referred to as a transport path, and in the transport path, an original sheet side of the medium 90 is also referred to as upstream of the transport path, and a side on which the printed material is wound is also referred to as downstream of the transport path. In the transport path, a direction in which the medium 90 is transported from upstream to downstream is also referred to as a transport direction.

The support section 12 includes a first support plate 16, a second support plate 17, and a third support plate 18. The first support plate 16, the second support plate 17, and the third support plate 18 are arranged along the transport path in this order from upstream to downstream of the transport path. The first support plate 16 includes a support surface 19, the second support plate 17 includes a support surface 20, and the third support plate 18 includes a support surface 21. The support surfaces 19, 20, and 21 support the medium 90 transported by the transport section 13. The support surface 20 is arranged to face the printing section 14, and the support surface 21 is arranged to face the heating device 15.

The transport section 13 includes a first rotation shaft 22 and a second rotation shaft 23. In the transport path, the first rotation shaft 22 is arranged upstream of the first support plate 16, and the second rotation shaft 23 is arranged downstream of the third support plate 18. The first rotation shaft 22 rotatably supports the roll body R1 of the original sheet of the medium 90. The second rotation shaft 23 rotatably supports the roll body R2 in which a printed material is wound in a roll shape.

Transport roller pairs 24 are arranged between the first support plate 16 and the second support plate 17, and between the second support plate 17 and the third support plate 18. Each of the transport roller pairs 24 is composed of a drive roller that is rotationally driven and a driven roller that is driven to rotate in accordance with a rotation of the drive roller. A pair of transport roller pair 24 transports the medium 90 by rotating with the medium 90 sandwiched therebetween. In the present embodiment, the configuration of the pair of transport roller pair 24 arranged so as to sandwich the second support plate 17 is shown, but the transport roller pair 24 may be arranged only upstream of the second support plate 17 without arranging the transport roller pair 24 downstream of the second support plate 17.

The printing section 14 includes a head 25, a carriage 26, and a guide shaft 27. The carriage 26 holds the head 25 and reciprocates along the X-axis. The guide shaft 27 extends along the X-axis and guides the reciprocating movement of the carriage 26.

The head 25 is arranged to be able to face the support surface 20 of the second support plate 17. The head 25 includes a plurality of nozzles (not shown) at positions capable of facing the support surface 20. To the head 25, for example, ink as liquid exhibiting each color such as black, cyan, magenta, and yellow is individually supplied. The plurality of nozzles ejects each color ink toward the medium 90 supported on the support surface 20. The liquid ejected by the head 25 is not limited to ink, and may be, for example, treatment liquid or a coating material.

As described above, the head 25 is reciprocated along the X-axis while transporting the medium 90, and ink is deposited to the medium 90 at an arbitrary timing, thereby forming an image such as a text, a photograph, or a pattern on the medium 90.

Of front and back surfaces of the medium 90, a surface to which liquid ejected from the head 25 deposits is a process surface 91. That is, the process surface 91 is a surface facing the head 25 in a direction along a Z-axis when the medium 90 is supported by the support surface 20.

The heating device 15 is arranged so as to face the support surface 21 of the third support plate 18. The heating device 15 heats the medium 90 to which liquid is deposited by the printing section 14 and which is transported by the transport section 13. Specifically, the heating device 15 heats the process surface 91 of the medium 90 supported by the support surface 21. As a result, a volatile component of liquid on the process surface 91 is volatilized by heating and dried.

The heating device 15 is arranged at a distance from the support surface 21. The space between the process surface 91 and the support surface 21, and the heating device 15 is a heating region 30 heated by the heating device 15. The medium 90 to which liquid is deposited is heated by passing through the heating region 30.

The heating device 15 includes a heating section 41, a blower machine 43, an air flow path 44, sound absorbing materials 101 and 103, pressing members 102 and 104, and a housing 42. The heating section 41 includes two heat sources 45. The blower machine 43 blows gas such as air to the air flow path 44 as an air stream. The housing 42 accommodates the above-described components.

The heat source 45 is an infrared heater, and generates heat for heating liquid deposited to the medium 90. Each of the two heat sources 45 has a substantially cylindrical shape, a height direction of the cylinder is along the X-axis, and the heat sources 45 are arranged side by side in the transport direction intersecting the X-axis so as to face the support surface 21. That is, each heat source 45 can face the process surface 91 of the medium 90 when the medium 90 is supported by the support surface 21. Since the heat source 45 is an infrared heater, heat can be generated relatively efficiently. The heat source of the present disclosure is not limited to an infrared heater.

A reflective plate 46 is attached to each of the two heat sources 45. Each of the reflective plates 46 is arranged so as to surround a region opposite to the support surface 21 with respect to the corresponding heat source 45. Thus, the two reflective plates 46 reflect infrared rays emitted from the corresponding heat sources 45 toward the support surface 21. A range of the heating region 30 can be adjusted by an arrangement of the heat source 45 and the reflective plate 46.

A cross section of the housing 42 viewed from a direction along the X-axis has an elongated shape along the transport direction. The housing 42 includes an inner wall 51 surrounding the heating section 41, and an outer wall 52 arranged outside the inner wall 51 and surrounding the inner wall 51. The outer wall 52 is an example of an outer member of the present disclosure. The outer wall 52 surrounds the air flow path 44, and the air flow path 44 through which gas flows is formed between the inner wall 51 and the outer wall 52.

The housing 42 is provided with an inflow port 53 and an outflow port 54. The inflow port 53 is arranged on a side surface corresponding to downstream of the transport path in the housing 42. Specifically, the inflow port 53 is arranged on an opposite side of the heating section 41 from a side on which the printing section 14 is located. That is, the inflow port 53 is located downstream of the heating section 41 in the transport path.

The outflow port 54 is arranged on a side where the printing section 14 is located with respect to the heating section 41. That is, the outflow port 54 is located upstream of the heating section 41 in the transport path.

The outflow port 54 is opened so as to face downstream of the transport path. That is, gas is blown from the outflow port 54 toward downstream where the inflow port 53 is located.

At the inflow port 53, air is sucked into the air flow path 44. Air is blown toward the heating region 30 at the outflow port 54. The air flow path 44 extends from the inflow port 53 to the outflow port 54. The air flow path 44 is provided so as to surround the heat source 45 of the heating section 41.

The air flow path 44 includes the blower machine 43 inside. Specifically, the blower machine 43 is arranged substantially in the center of a region along the outer wall 52 in the air flow path 44. The blower machine 43 is an electric blower fan, and is rotationally driven by a motor (to be described later). The blower machine 43 is capable of blowing gas toward the medium 90 supported by the support surface 21. Although not shown, a plurality of blower machines 43 are arranged along the X-axis in accordance with the width of the medium 90 (the length in a direction intersecting with the transport direction). The air flow path 44 may be configured to include a flow path partitioned for each blower machine 43, or to include one flow path for a plurality of blower machines 43.

In FIG. 1, flow of gas sucked from the inflow port 53 and blown out from the outflow port 54 is indicated by arrows of broken lines. A direction in which gas flows is defined as a blowing direction. By the operation of the blower machine 43, air outside the housing 42 is sucked into the air flow path 44 mainly as a flow A. Air sucked into the air flow path 44 flows in a substantially straight line, and further advances in a straight line through the blower machine 43. In the air flow path 44, a region in which air advances in a substantially straight line is referred to as a straight flow path.

The air flow path 44 includes the straight flow path on a side of the outflow port 54 with respect to the blower machine 43, in other words, on a downstream side in the blowing direction with respect to the blower machine 43. The air flow path 44 also includes the straight flow path on a side of the inflow port 53 with respect to the blower machine 43, in other words, on an upstream side in the blowing direction with respect to the blower machine 43. The blowing direction in the straight flow path is substantially opposite to the transport direction of the medium 90 on the support surface 21.

Through the straight flow path, a direction of gas is bent along the outer wall 52 substantially above the air flow path 44, and the gas is blown out from the outflow port 54 toward the process surface 91 as a flow B. That is, the blower machine 43 blows gas toward the heating region 30 from a side facing the process surface 91.

Gas blown out from the outflow port 54 is blown to the process surface 91 of the medium 90 supported by the support surface 21. Next, gas flows along the process surface 91 in the transport direction as a flow C. Then, gas sent out from the outflow port 54 advances along the process surface 91 through the heating region 30, and is discharged to the outside from between the process surface 91 and the support surface 21 and the lower end section of the heating device 15 mainly as a flow D. Then, a part of gas discharged to the outside is again sucked from the inflow port 53 to the air flow path 44. Thus, a circulation path 55 including the air flow path 44 and the heating region 30 is formed.

Gas circulating in the circulation path 55 is heated by the heating section 41. Therefore, the temperature of gas blown out from the outflow port 54 is higher than that in a case where gas is not circulated. That is, gas flowing along the process surface 91 includes gas that has already been heated by the heating section 41. Therefore, the temperature of gas flowing along the process surface 91 is higher than that in a case where gas is not circulated. Since the air flow path 44 is arranged so as to surround the heating section 41, the temperature in the air flow path 44 also increases due to heat generated from the heating section 41. Since gas circulating in the circulation path 55 passes through the air flow path 44, heat generated by the two heat sources 45 is recovered and reused for heating liquid.

When the heating section 41 heats the medium 90, a volatile component of liquid deposited to the medium 90 are evaporated to generate vapor. When the generated vapor is floating in the vicinity of the process surface 91 of the medium 90, liquid of the medium 90 is hardly dried. Therefore, the heating device 15 discharges vapor generated from liquid to the outside together with the flow D of gas, thereby suppressing an increase in humidity in the circulation path 55.

The heating device 15 dries the liquid deposited to the medium 90 by blowing gas to the medium 90 while heating the medium 90 supported on the support surface 21. Specifically, first, the medium 90 on which printing has been performed is transported along the support section 12. Next, when the medium 90 reaches the heating region 30, drying of liquid of the medium 90 is promoted by heat generated by the two heat sources 45 and gas blown out from the outflow port 54. The heating device 15 dries liquid of the medium 90 by radiant heat from the heat source 45 and blowing of gas by the blower machine 43.

The blower machine 43 can change a blowing speed of gas, that is, a wind speed. Since the temperature of the process surface 91 can be changed by changing a wind speed, the temperature of the process surface 91 is controlled by a driving amount of the blower machine 43. Specifically, the temperature of the process surface 91 is adjusted by the number of rotations of a fan of the blower machine 43 while outputs of the two heat sources 45 are kept constant. In the related art device, when the number of rotations of the blower fan is increased, noise generated from the blower fan or the like may increase. On the other hand, in the printing device 1 of the present embodiment, noise generated from the blower machine 43 or the like is reduced by the sound absorbing materials 101 and 103. The temperature of the process surface 91 may be adjusted not only by the number of rotations of the fan of the blower machine 43 but also by other factors.

The sound absorbing materials 101 and 103 and the pressing members 102 and 104 are arranged on an inner surface of the air flow path 44. Specifically, the sound absorbing materials 101 and 103 are arranged inside the outer wall 52 and arranged along the blowing direction of the blower machine 43. The sound absorbing material 101 is arranged facing the straight flow path upstream of the blower machine 43 in the blowing direction. The sound absorbing material 103 is arranged facing the straight flow path downstream of the blower machine 43 in the blowing direction.

The sound absorbing materials 101 and 103 and the pressing members 102 and 104 are substantially plate-shaped members. A known sound absorbing material such as glass wool is applied to the sound absorbing materials 101 and 103. A metal plate or a resin plate is applied to the pressing members 102 and 104.

Since the sound absorbing materials 101 and 103 are arranged along the blowing direction, a flow of gas in the air flow path 44 is hardly obstructed. As a result, blowing efficiency of the blower machine 43 and drying property of liquid on the medium 90 can be improved.

Since the sound absorbing materials 101 and 103 are arranged so as to face the straight flow path, the sound absorbing materials 101 and 103 can be formed in a relatively simple shape such as a plate shape. As a result, it is possible to suppress the labor required for processing and installing the sound absorbing materials 101 and 103.

The pressing member 102 supports the sound absorbing material 101 arranged on an inner surface of the air flow path 44, and pressing member 104 supports the sound absorbing material 103 arranged on the inner surface. More specifically, the sound absorbing material 101 is arranged between the outer wall 52 and the pressing member 102, and the sound absorbing material 103 is arranged between the outer wall 52 and the pressing member 104.

As a result, for example, as compared with a case where the sound absorbing materials 101 and 103 are attached to the outer wall 52 by an adhesive or the like, it is possible to prevent the sound absorbing materials 101 and 103 from peeling off or falling off due to heat. Since the sound absorbing materials 101 and 103 are sandwiched and arranged, the sound absorbing materials 101 and 103 can be more steadily supported and prevented from being displaced. Further, since the sound absorbing materials 101 and 103 also function as a insulation material, heat of gas in the heating section 41 and the air flow path 44 is difficult to propagate. As a result, overheating of the outer wall 52 is suppressed.

Although not shown, the pressing members 102 and 104 include holes (to be described later). The pressing members 102 and 104 support the sound absorbing materials 101 and 103 in a state in which the sound absorbing materials 101 and 103 are exposed to an inner surface of the air flow path 44 via the holes. Details of the pressing members 102 and 104 will be described later.

Figure 2:
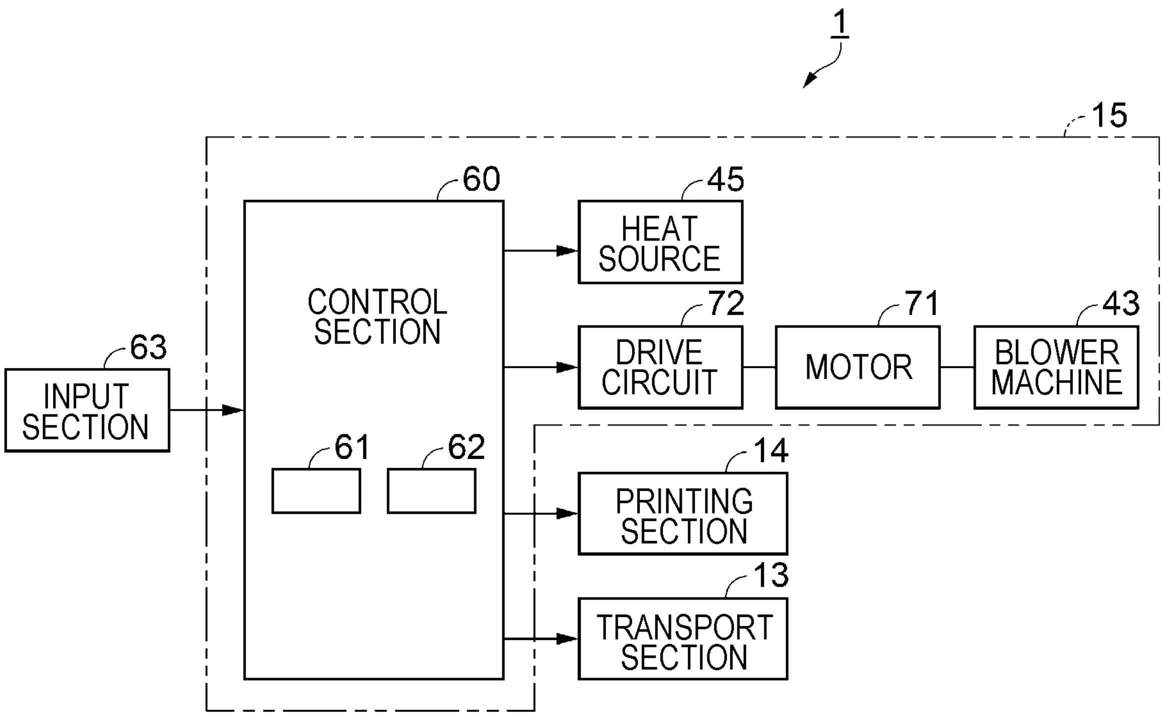
FIG. 2 is a block diagram showing an electrical configuration of the printing device.

As shown in FIG. 2, the control section 60 includes a central processing unit (CPU) 61 and a storage section 62 including a random access memory (RAM) and a read only memory (ROM). Various programs for controlling the printing device 1 are stored in the storage section 62. The control section 60 may include dedicated hardware (application specific integrated circuit: ASIC) that executes at least a part of various processes. That is, the control section 60 may be configured as a circuit including one or more processors operating in accordance with a computer program (software), one or more dedicated hardware circuits such as an ASIC, or a combination thereof.

The control section 60 is electrically connected to the printing section 14 and the transport section 13. In addition to the control of the heat source 45, a motor 71, and the like, the control section 60 also controls the operation of the printing section 14 and the above-described transport roller pair 24 of the transport section 13.

A processor includes a CPU and memory, such as RAM and ROM. The memory stores program code or commands configured to cause the CPU to perform processing. Memory, or computer readable medium, includes anything accessible by a general purpose or special purpose computer.

The heating device 15 includes the motor 71 that drives the blower machine 43, and a drive circuit 72 that drives the motor 71. The drive circuit 72 is a motor driver that controls a driving amount of the blower machine 43 by controlling voltage applied to the motor 71. The drive circuit 72 may control a driving amount of the blower machine 43 by pulse width modulation (PWM) control. The drive circuit 72 is not particularly limited as long as a driving amount of the blower machine 43 can be controlled by control of the motor 71.

The printing device 1 includes an input section 63 electrically connected to the control section 60. The type of the medium 90 to be applied to printing by the printing section 14 is input to the control section 60 via the input section 63. The input section 63 is, for example, an operation panel operated by a user of the printing device 1. The control section 60 controls the drive circuit 72 in accordance with the type of the medium 90 input via the input section 63.

As a result, voltage applied to the motor 71 can be changed in accordance with the type of the medium 90, and a driving amount of the blower machine 43 can be changed in accordance with the type of the medium 90. A wind speed of gas blown from the blower machine 43 varies depending on a driving amount of the blower machine 43. When a driving amount of the blower machine 43 is increased, a wind speed of gas blown from the blower machine 43 is increased. Here, when a driving amount of the blower machine 43 is changed, a frequency of noise generated from the blower machine 43 may also be changed.

The control of the heating device 15 performed by the control section 60 when liquid deposited to the medium 90 is dried will be described below. The control section 60 controls output of the heat source 45. The control section 60 keeps output of the heat source 45 constant regardless of the type of medium 90. For example, the output of the heat source 45 is kept at the maximum output, that is, 100%. The constant output referred to here may include a variation in output that does not affect heat generated by the heat source 45 or that has a negligible effect on the heat. In other words, a variation in output that does not affect drying of the medium 90 is included in "constant".

The control section 60 changes a wind speed of gas flowing through the heating region 30 by changing a driving amount of the blower machine 43 in accordance with the type of medium 90. In addition to the type of the medium 90, the control section 60 changes a driving amount of the blower machine 43 in accordance with an amount of liquid deposited to the medium 90.

The control section 60 controls surface temperature of the medium 90, that is, temperature of the process surface 91, by changing a wind speed of gas while keeping output of the heat source 45 constant. The control section 60 controls a driving amount of the blower machine 43 so that temperature of the process surface 91 does not exceed allowable temperature and an evaporation amount of liquid sufficient for drying the medium 90 is secured.

An evaporation amount of liquid sufficient for drying the medium 90 varies depending on an amount of liquid ejected to the medium 90, the type of the medium 90, and the like. In FIG. 2, the control section 60 is shown as a configuration included in the heating device 15. Therefore, the heating device 15 can be made to function independently of the printing device 1. The present disclosure is not limited thereto, and the control section 60 may not be included in the heating device 15, and may control the transport section 13, the printing section 14, and the heating device 15 as a position for controlling the entire printing device 1.

Figure 3:
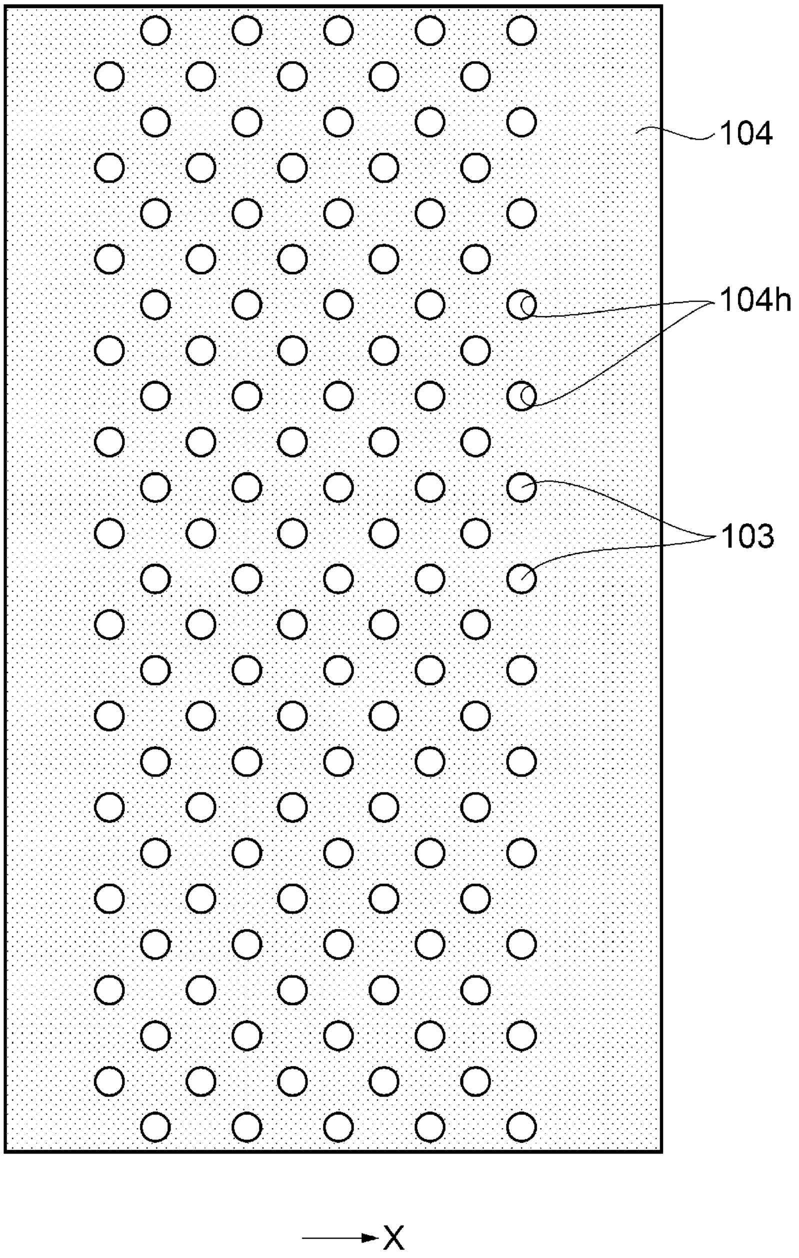
FIG. 3 is a plan view showing an example of a pressing member.

As shown in FIG. 3, both the sound absorbing material 103 and the pressing member 104 are substantially rectangular plate-shaped members. Here, FIG. 3 and FIGS. 4 to 6, which will be described later, show a state in plan view from a normal direction with respect to a main surface of the plate-shaped sound absorbing material 103. In FIGS. 3 to 6, a lower side of the drawing corresponds to a upstream side in the blowing direction, and an upper side of the drawing corresponds to a downstream side in the blowing direction.

Although the sizes of the sound absorbing material 101 and the pressing member 102 in a plan view are different from each other, the other configurations are the same as those of the sound absorbing material 103 and the pressing member 104. Therefore, a description of the sound absorbing material 101 and the pressing member 102 is omitted. The sound absorbing material 101 and the sound absorbing material 103 may be integrally formed, and the pressing member 102 and the pressing member 104 may also be integrally formed.

The pressing member 104 is made of a perforated metal including a plurality of substantially circular holes **104*h*. The sound absorbing material 103 is exposed to an inner surface of the above-described air flow path 44 via the plurality of holes 104*h*. As a result, the sound absorbing material 103 can be reliably supported by the pressing member 104**, and noise can be reduced.

Although the holes **104*h* are substantially circular in FIG. 3, the shape of the holes 104*h* are not limited to this. The holes 104*h* may have a polygonal shape or an irregular shape. The plurality of holes 104*h* may have different shapes. The number and size of the holes 104*h* are set in accordance with noise generated from the blower machine 43**.

Figure 4:
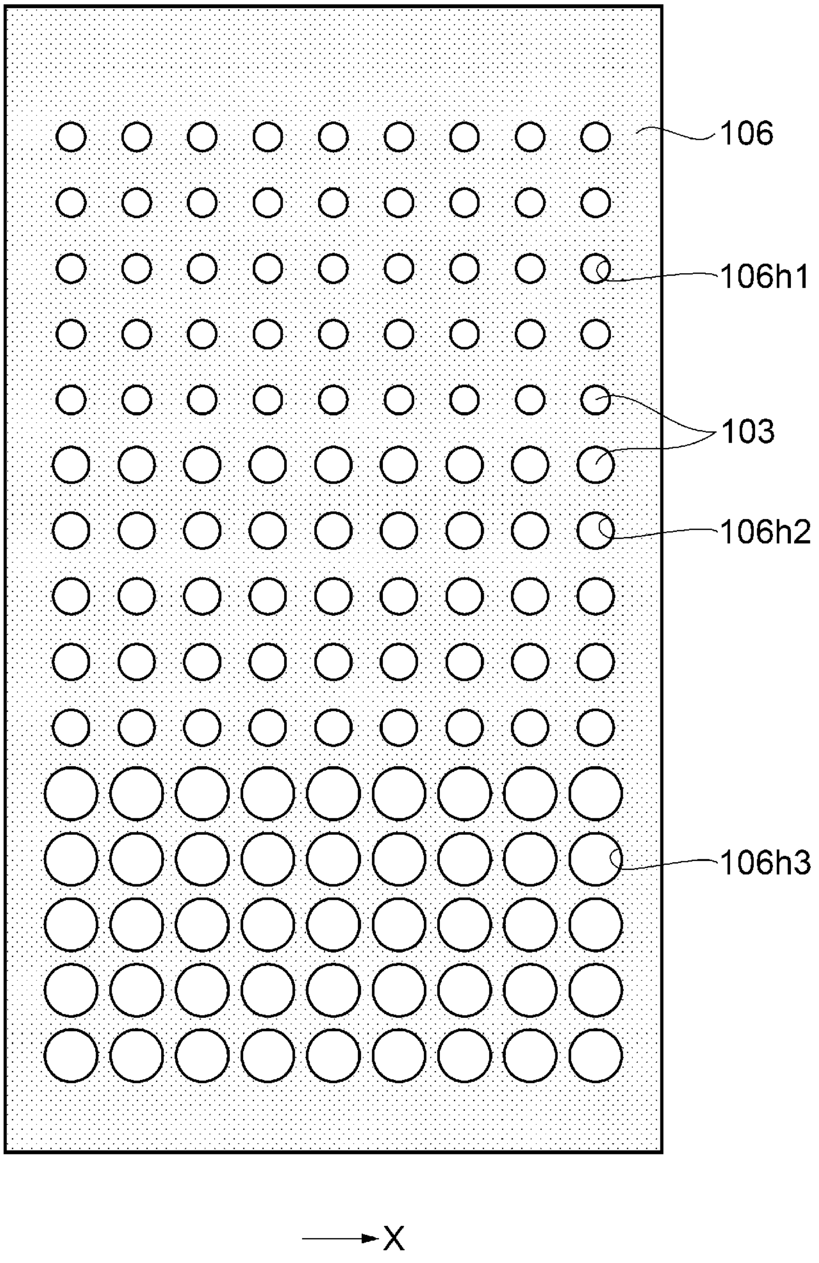
FIG. 4 is a plan view showing an example of the pressing member.

As shown in FIG. 4, a pressing member 106 may be used instead of the pressing members 102 and 104. The pressing member 106 is made of perforated metal like the pressing members 102 and 104. The perforated metal, that is, the pressing member 106 includes a plurality of types of holes **106*h*1, 106*h*2, and 106*h*3** having different sizes.

The holes **106*h*1, 106*h*2, and 106*h*3 are substantially circular and have different sizes from each other. The diameter of the hole 106*h*1 is smaller than the diameter of the hole 106*h*2, and the diameter of the hole 106*h*3 is larger than the diameter of the hole 106*h*2**.

As described above, when a driving amount of the blower machine 43 is changed to change the number of rotations of the fan, a frequency of noise generated from the blower machine 43 may change. Specifically, for example, when the number of rotations is low, a frequency of noise is relatively low, and when the number of rotations is high, a frequency of noise is relatively high.

On the other hand, since the holes **106*h*1, 106*h*2, and 106*h*3 are different in size from each other, the surface area of the exposed sound absorbing material 103 is different, and a range of a frequency of noise to be reduced is widened. That is, since the hole 106*h*1 has a small diameter, it corresponds to noise having a relatively high frequency. Since the hole 106*h*3 has a large diameter, it corresponds to noise having a relatively low frequency. The hole 106*h*2** corresponds to noise of a medium frequency. As a result, noise of different frequencies can be reduced.

There are three types of holes having different sizes in the pressing member 106, but the types of holes are not limited to three types. In the pressing member 106, the holes **106*h*3 are arranged on an upstream side and the holes 106*h*1 are arranged on a downstream side in the blowing direction, but the arrangement is not limited thereto. For example, the holes 106*h*1 may be arranged upstream and the holes 106*h*3** may be arranged downstream.

Figure 5:
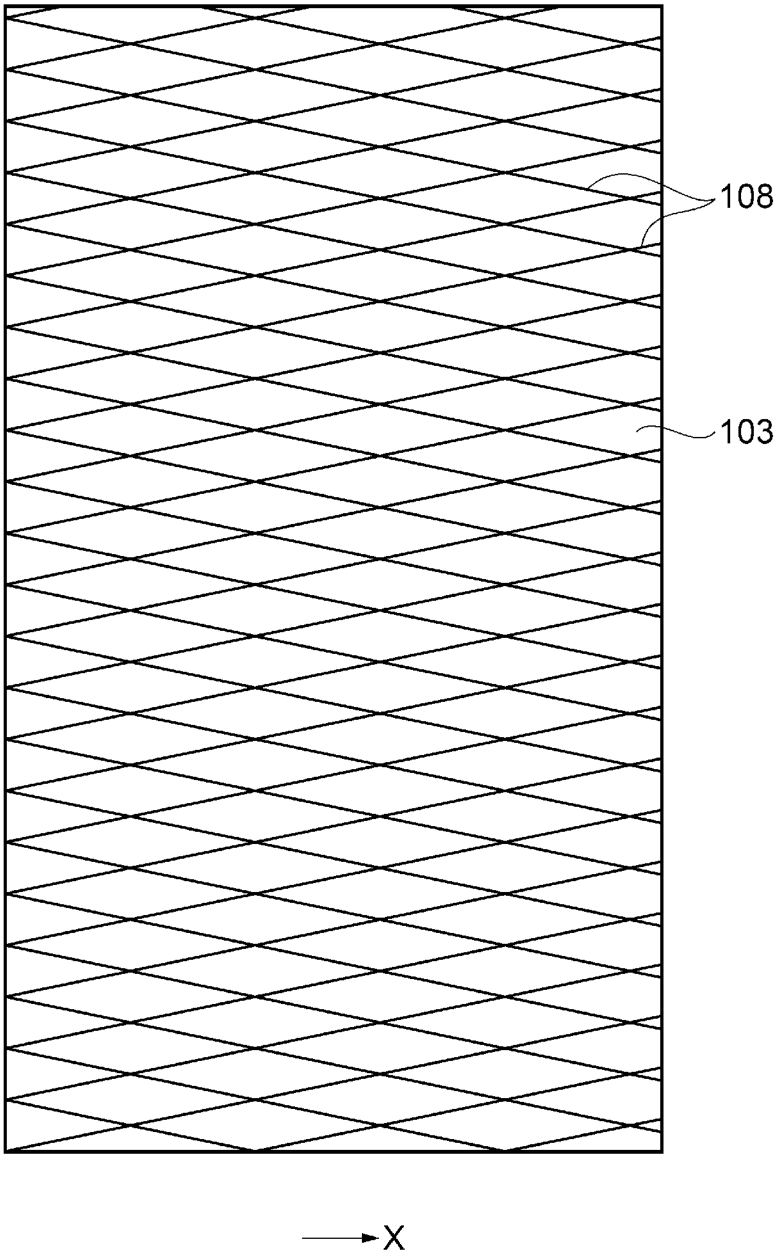
FIG. 5 is a plan view showing an example of the pressing member.

A member other than a perforated metal may be used for the pressing member of the present disclosure as long as the sound absorbing materials 101 and 103 are steadily supported. For example, as shown in FIG. 5, a pressing member 108 may be used instead of the pressing members 102 and 104. The pressing member 108 is made of an expanded metal. The sound absorbing material 103 is steadily supported by the pressing member 108, and the sound absorbing material 103 is exposed to an inner surface of the air flow path 44 via the pressing member 108. Accordingly, it is possible to obtain an effect similar to that of the pressing member 104.

Figure 6:
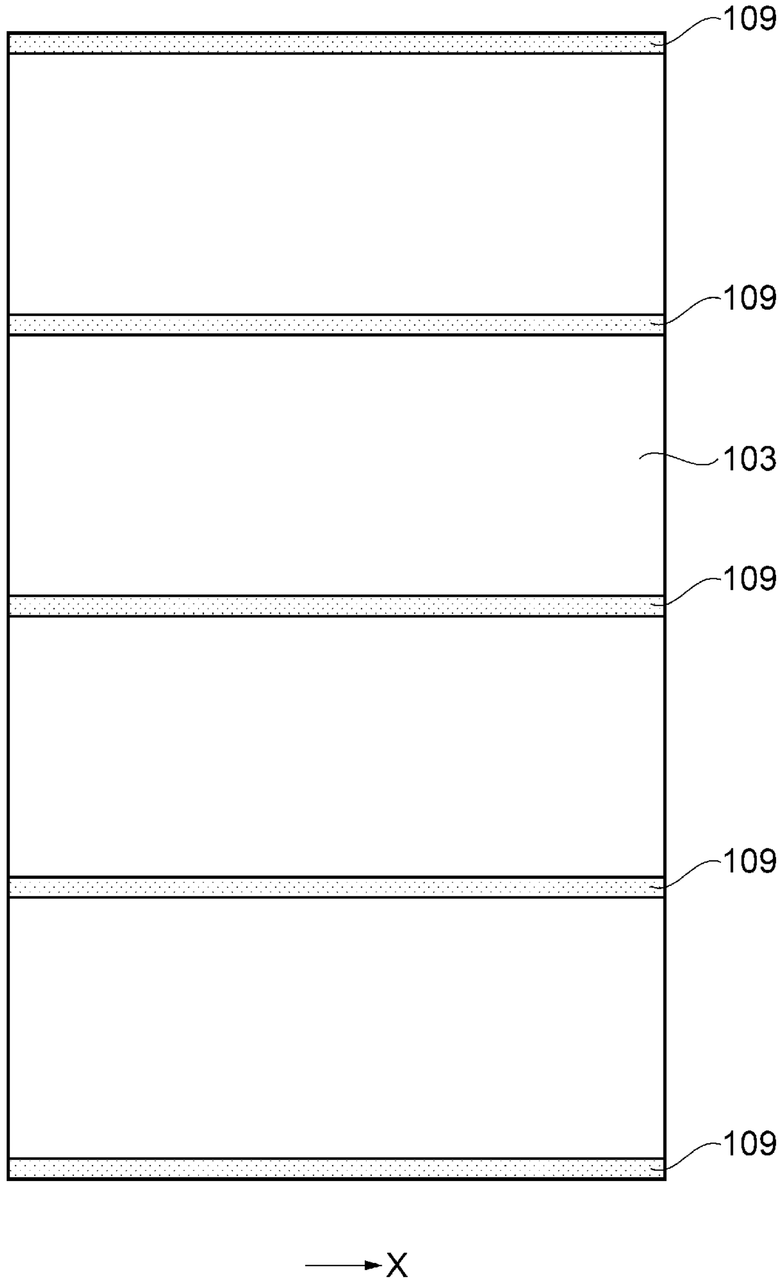
FIG. 6 is a plan view showing an example of the pressing member.

For example, as shown in FIG. 6, a pressing member 109 may be used instead of the pressing members 102 and 104. The pressing member 109 is a substantially rod-shaped member. The sound absorbing material 103 is steadily supported by the pressing member 109, and the sound absorbing material 103 is exposed to an inner surface of the air flow path 44 via the pressing member 109. The pressing member 109 increases a surface area of the sound absorbing material 103 exposed to the air flow path 44 as compared with the pressing member 104. Therefore, the pressing member 109 can further reduce noise as compared with the pressing member 104.

According to the present disclosure, the following effects can be obtained.

Noise generated from the blower machine 43 can be reduced. Specifically, noise of the blower machine 43 is wind noise of the fan, driving noise of the motor 71, or the like. These noises propagate in the air flow path 44 together with the air blowing of the blower machine 43. Since the sound absorbing materials 101 and 103 are arranged on an inner surface of the air flow path 44, it is possible to effectively reduce the noise. Therefore, it is possible to provide the printing device 1 that reduces noise generated from the blower machine 43 and the like.

2. Second Embodiment

The printing device 1 according to the present embodiment employs a heating device 215 instead of the heating device 15 of the first embodiment. In the following description, the same reference numerals are used for the same components as those of the first embodiment, and the duplicated description will be omitted.

Figure 7:
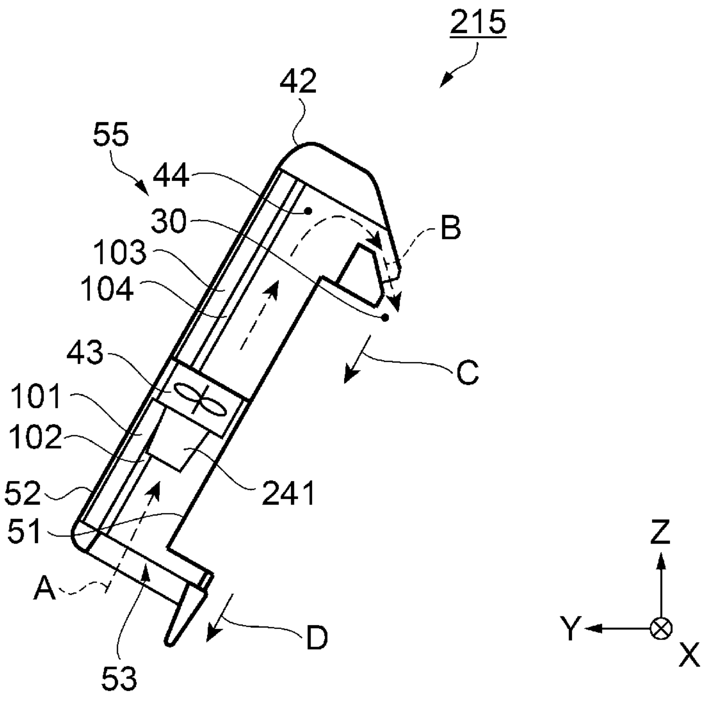
FIG. 7 is a schematic diagram showing an arrangement of a heat source and a blower machine according to a second embodiment.

As shown in FIG. 7, the heating device 215 includes a heat source 241 as a heating section, the blower machine 43, the air flow path 44, the sound absorbing materials 101 and 103, the pressing members 102 and 104, and the housing 42. The heat source 241 is arranged inside the air flow path 44 and upstream in the blowing direction of the blower machine 43. This point is different from the heating device 15 of the above-described embodiment.

The air flow path 44 is provided so as to include and surround the heat source 241. The heat source 241 is a heating wire that heats gas such as air. Therefore, the heating device 215 blows heated high-temperature gas to the heating region 30. The blower machine 43 can adjust the temperature of the heating region 30 by changing a blowing speed of gas, that is, a wind speed to change a blowing amount of heated gas. According to the present embodiment, since a blowing amount of heated gas increases as a wind speed increases, the temperature of the heating region 30 can be increased.

As a result, heat can be generated with a relatively simple and inexpensive configuration as compared with the heat source 45 of the above-described embodiment. As compared with the above-described embodiment, although the heat source 241 is arranged near the outer wall 52, the sound absorbing materials 101 and 103 also function as insulation materials, so that overheating of the outer wall 52 is suppressed.

The heat source 241 is not limited to being arranged upstream in the blowing direction of the blower machine 43, but may be arranged downstream in the blowing direction. That is, a heating wire of the heat source 241 may be configured to heat gas sent out by the blower machine 43. As a result, overheating of the fan of the blower machine 43 can be suppressed as compared with a case where the heat source 241 is located upstream of the blower machine 43 in the blowing direction.

According to the present embodiment, the same effects as those of the first embodiment can be obtained.

What is claimed is:

1. A printing device comprising:

a printing section configured to eject liquid to a medium;

a heat source configured to generate heat for heating the liquid deposited on the medium;

a blower machine configured to blow gas toward the medium;

an air flow path in which the blower machine is provided and in which the gas flows, wherein the air flow path is provided so as to surround the heat source;

an outer member surrounding the air flow path;

a sound absorbing material is arranged on an inner surface of the outer member; and a pressing member configured to support the sound absorbing material arranged on the inner surface of the outer member such that the sound absorbing material is at least partially exposed to the air flow path.

2. The printing device according to claim 1, wherein the sound absorbing material is arranged along a blowing direction of the blower machine.

3. The printing device according to claim 2, wherein the air flow path includes a straight flow path downstream in the blowing direction; and the sound absorbing material is arranged facing the straight flow path.

4. The printing device according to claim 1, wherein the pressing member is made of a perforated metal.

5. The printing device according to claim 4, wherein the blower machine is configured to change a blowing speed of the gas and the perforated metal includes holes having different sizes.

6. The printing device according to claim 1, wherein the heat source is an infrared heater configured to face the medium.

7. The printing device according to claim 1, wherein the heat source is a heating wire that is arranged in the air flow path and that heats the gas.

8. The printing device according to claim 7, wherein the heating wire heats the gas sent out by the blower machine.

* * * * *